United States Patent
Burmester et al.

(10) Patent No.: US 9,683,456 B2
(45) Date of Patent: Jun. 20, 2017

(54) HEAT SHIELD FOR AN EXHAUST GAS TURBOCHARGER AND ARRANGEMENT OF A HEAT SHIELD BETWEEN TWO HOUSING PARTS OF AN EXHAUST GAS TURBOCHARGER

(71) Applicant: IHI CHARING SYSTEMS INTERNATIONAL GMBH, Heidelberg (DE)

(72) Inventors: Hermann Burmester, Heidelberg (DE); Joachim Delitz, Heddesbach (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 308 days.

(21) Appl. No.: 14/175,631

(22) Filed: Feb. 7, 2014

(65) Prior Publication Data
US 2015/0252689 A1 Sep. 10, 2015

Related U.S. Application Data

(63) Continuation-in-part of application No. PCT/EP2012/003840, filed on Sep. 13, 2012.

(30) Foreign Application Priority Data

Sep. 22, 2011 (DE) .................. 10 2011 114 060

(51) Int. Cl.
| | | |
|---|---|---|
| *F04D 29/58* | (2006.01) | |
| *F01D 25/14* | (2006.01) | |
| *F02C 6/12* | (2006.01) | |
| *F02C 7/24* | (2006.01) | |
| *F01D 25/16* | (2006.01) | |

(Continued)

(52) U.S. Cl.
CPC ......... *F01D 25/145* (2013.01); *F01D 25/162* (2013.01); *F01D 25/24* (2013.01); *F01D 25/28* (2013.01); *F02C 6/12* (2013.01); *F02C 7/24* (2013.01); *F05D 2220/40* (2013.01); *F05D 2240/15* (2013.01); *F05D 2240/50* (2013.01);

(Continued)

(58) Field of Classification Search
CPC ........ F01D 25/145; F01D 25/125; F02C 7/24; F05D 2240/15; F05D 2260/231
USPC .......................................................... 415/177
See application file for complete search history.

(56) References Cited

U.S. PATENT DOCUMENTS

| | | | | |
|---|---|---|---|---|
| 4,101,241 A | * | 7/1978 | Kasuya ................. | F01D 25/186 415/113 |
| 5,087,176 A | * | 2/1992 | Wieland ................. | F01D 5/025 415/177 |

(Continued)

*Primary Examiner* — Gregory Anderson
*Assistant Examiner* — Jason Fountain
(74) *Attorney, Agent, or Firm* — Klaus J. Bach

(57) ABSTRACT

In a heat shield for an exhaust gas turbocharger, by means of which at least a first area of the exhaust gas turbocharger is to be shielded against a second area in a heat insulating manner wherein the heat shield comprises at least one fastening structure by which the heat shield is attached to one of the housing parts of the exhaust gas turbocharger, the fastening structure is in the form of locking elements for interlocking the heat shield with the respective housing part. The invention also resides in an arrangement of a heat shield between two housing parts of an exhaust gas turbocharger in such a way that it is firmly attached to one housing part without contacting the other housing part.

4 Claims, 6 Drawing Sheets

(51) Int. Cl.
*F01D 25/24* (2006.01)
*F01D 25/28* (2006.01)
(52) U.S. Cl.
CPC .... *F05D 2260/231* (2013.01); *F05D 2260/38* (2013.01)

(56) References Cited

U.S. PATENT DOCUMENTS

| | | | | |
|---|---|---|---|---|
| 8,827,638 B2* | 9/2014 | Delitz | ................ | F02C 6/12 |
| | | | | 415/178 |
| 2011/0014036 A1* | 1/2011 | Boening | ............... | F02C 6/12 |
| | | | | 415/177 |
| 2014/0064994 A1* | 3/2014 | Hemer | ............... | F01D 25/14 |
| | | | | 417/406 |

* cited by examiner

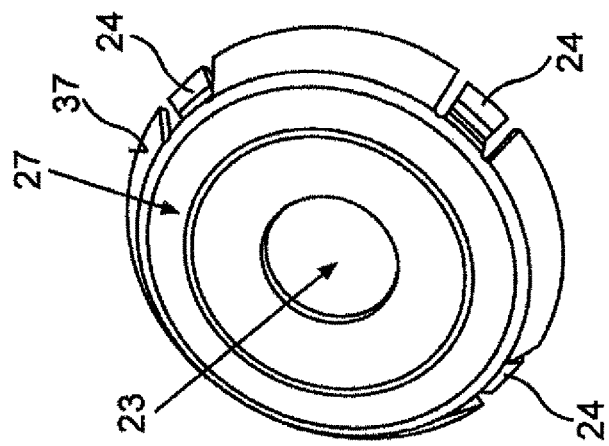
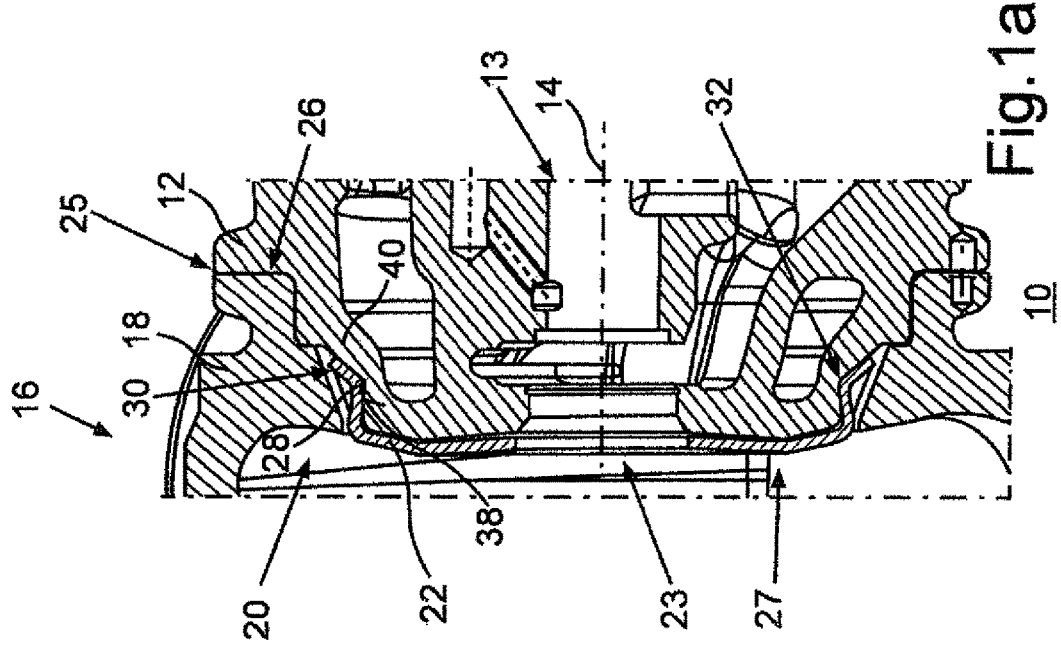

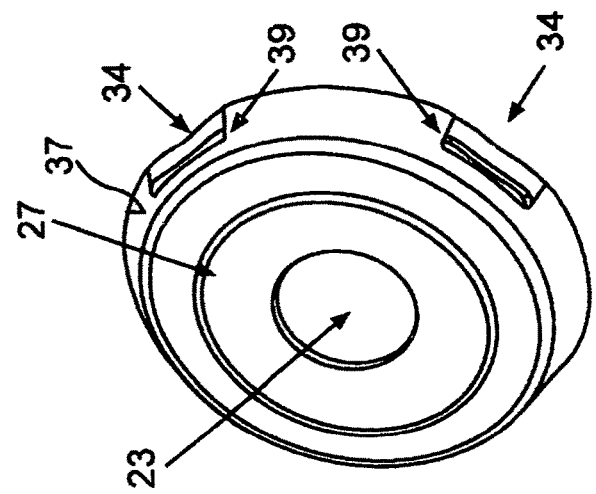
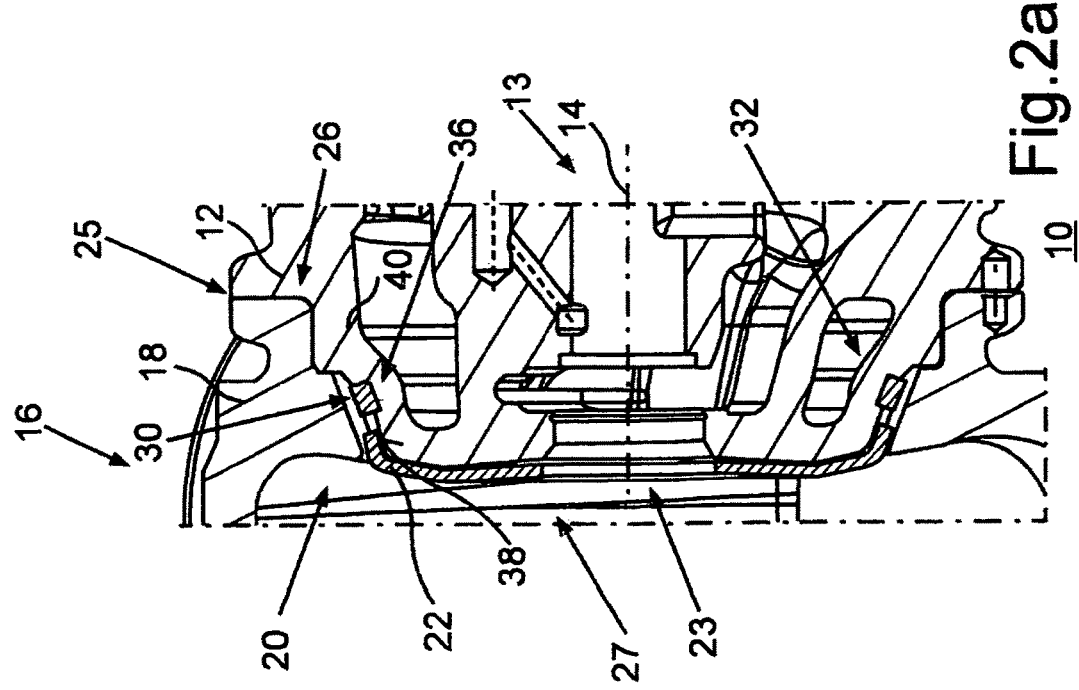

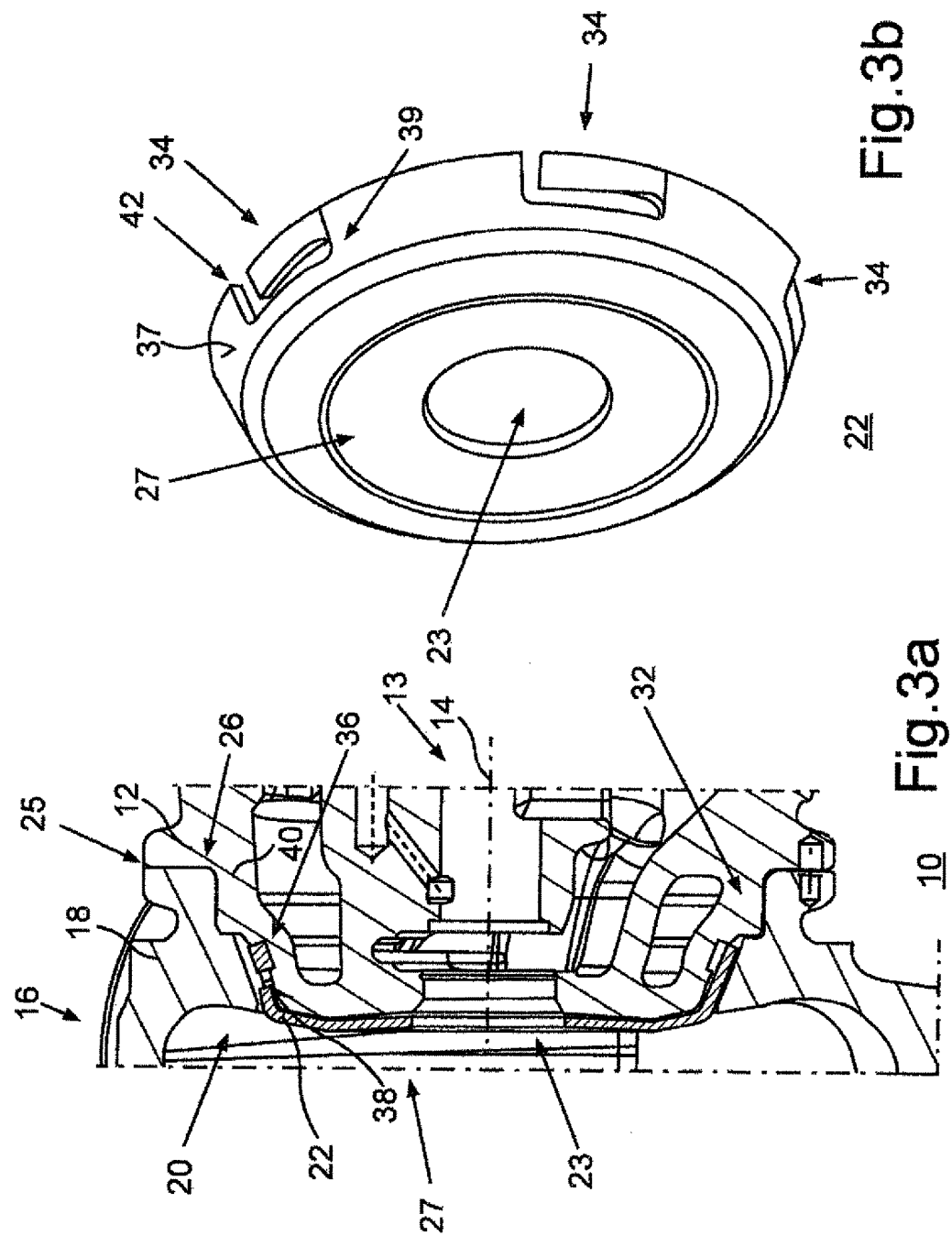

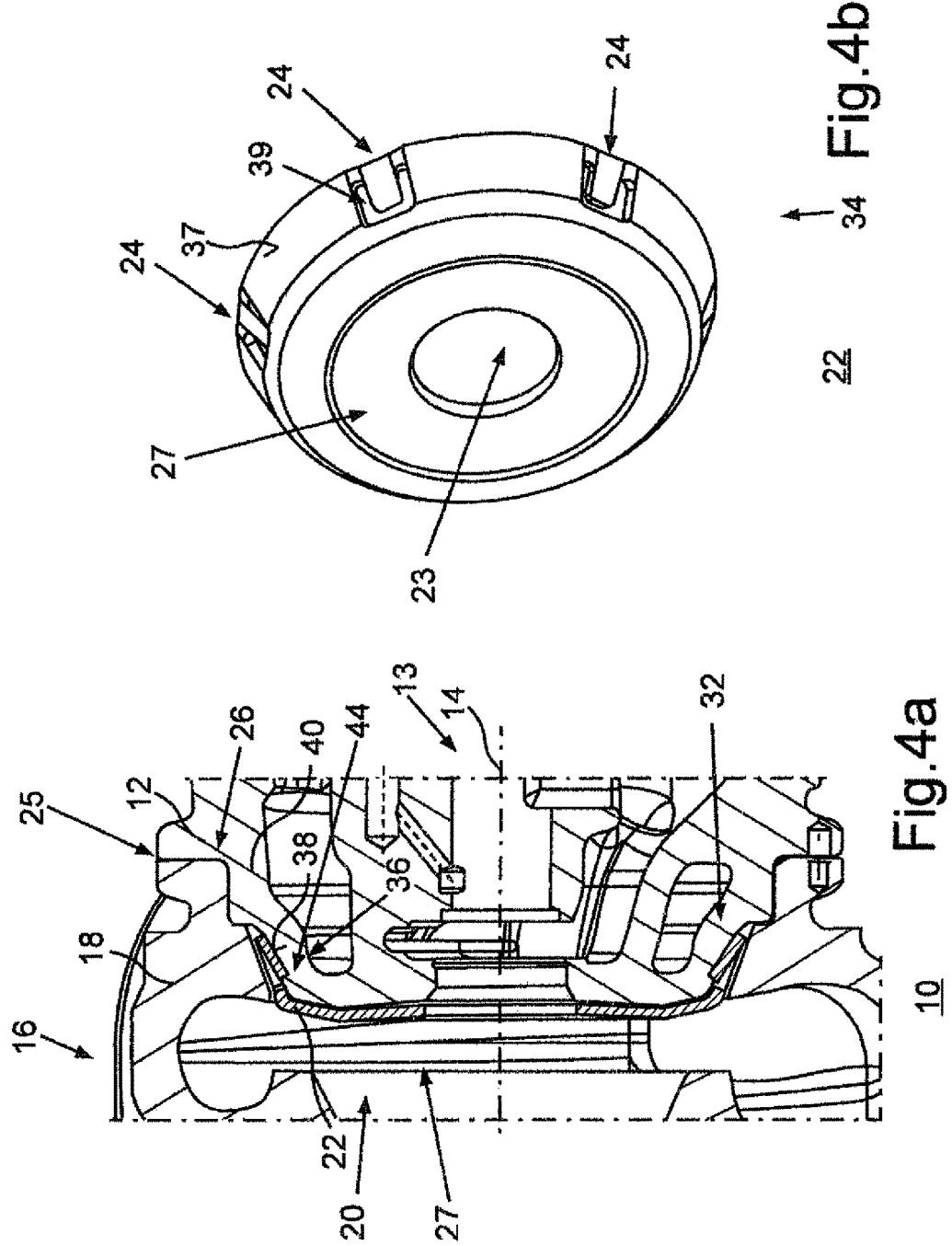

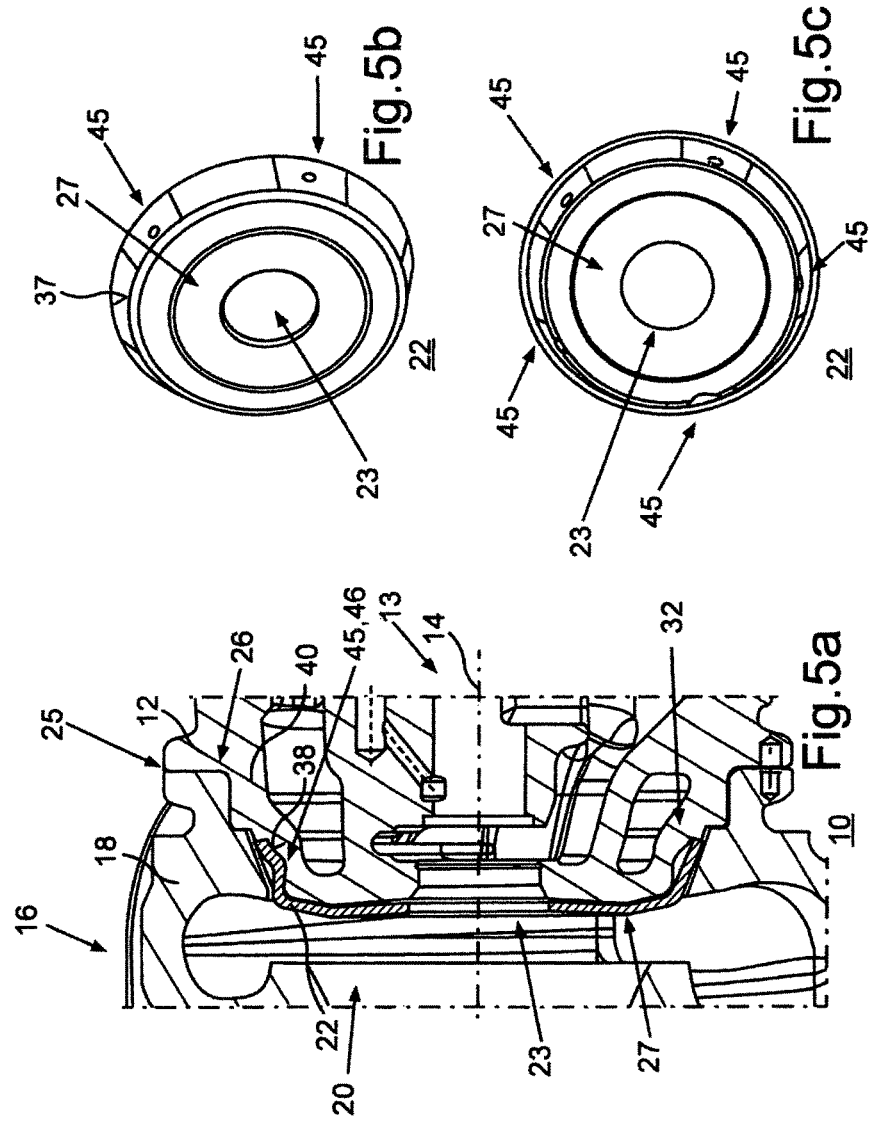

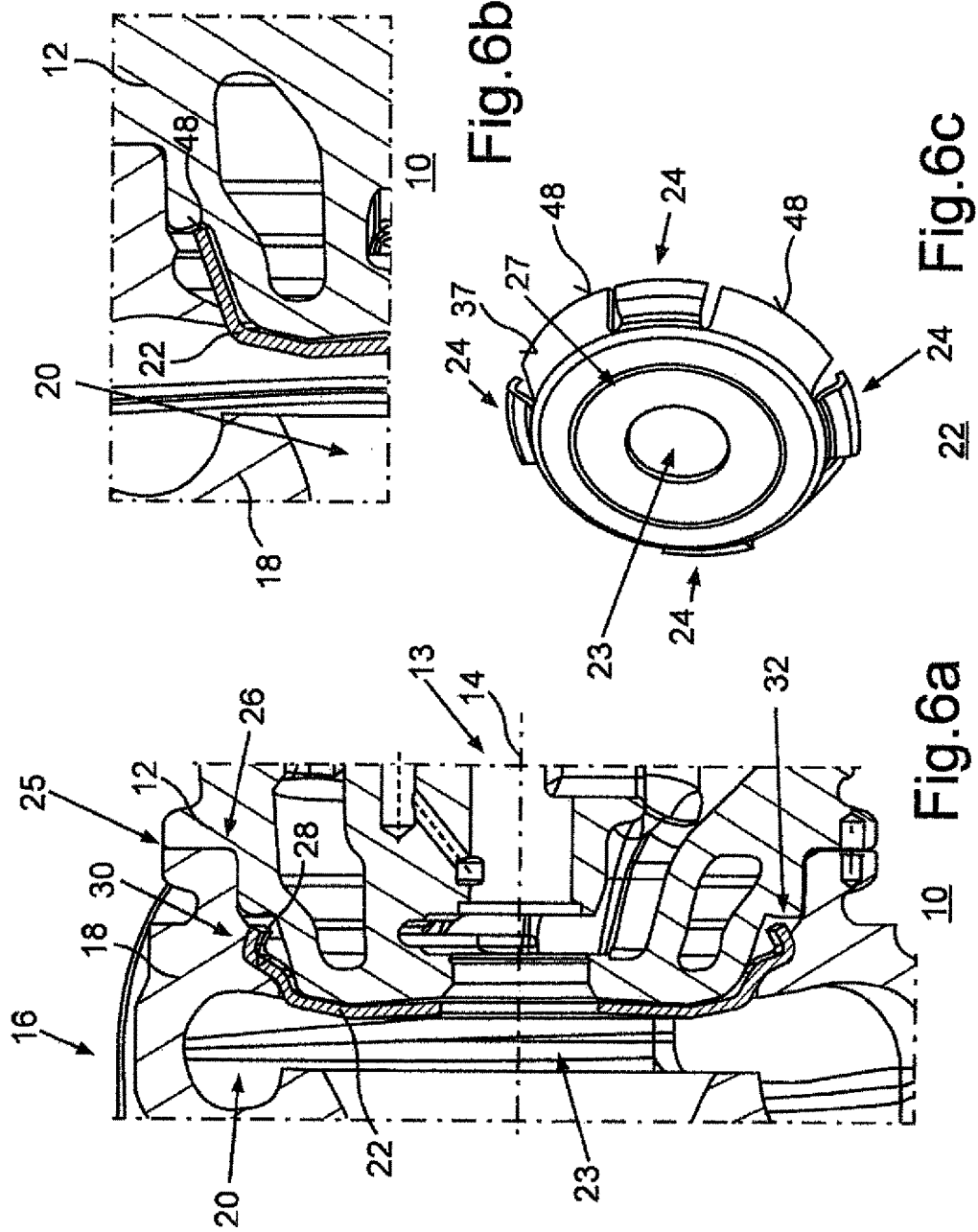

HEAT SHIELD FOR AN EXHAUST GAS TURBOCHARGER AND ARRANGEMENT OF A HEAT SHIELD BETWEEN TWO HOUSING PARTS OF AN EXHAUST GAS TURBOCHARGER

This is a Continuation-In-Part application of pending international patent application PCT/EP2012/003840 filed Sep. 13, 2012 and claiming the priority of German patent application 10 2011 114 060.7 filed Sep. 22, 2011.

BACKGROUND OF THE INVENTION

The invention relates to a heat shield for an exhaust gas turbocharger with fastening means for attaching the heat shield to a housing part and an arrangement of a heat shield between a turbine housing part and a bearing housing part of an exhaust gas turbocharger with the heat shield attached to the bearing housing part.

US 2011 0299983 A1 discloses a connection arrangement of a turbine housing with a bearing housing of an exhaust gas turbocharger, wherein the turbine housing and the bearing housing are centered to each other via a seal arrangement in the area of a connection joint with a heat shield being provided between the turbine housing and the bearing housing. The heat shield has openings for accommodating a centering means, by which the turbine housing and the bearing housing are in direct contact and centered to each other.

WO 2009/068460 discloses a heat shield for a turbocharger, wherein the heat shield has the shape of a disc or is formed in a single- or multi-stepped cup shape. The disc or the cup shape, respectively, comprises an outer edge, with the outer edge being provided with at least one recess portion. The recess portion and the outer edge form a web portion, with the web portion being bent outwardly in order to form a spring arm, and with the web portion being either closed or open at one point.

These arrangements of the heat shield require both a first housing part in the form of a bearing housing of the exhaust gas turbocharger and a second housing part in the form of a turbine housing of the exhaust gas turbocharger, in order to hold the heat shield in place between the two housing parts.

It is the object of the present invention to provide a heat shield for an exhaust gas turbocharger as well as an arrangement of the heat shield between two housing parts of an exhaust gas turbocharger in such a manner that the arrangement of the heat shield between the housing parts is improved and assembly is facilitated.

SUMMARY OF THE INVENTION

In a heat shield for an exhaust gas turbocharger, by which at least a first housing part of the exhaust gas turbocharger is to be shielded against a second housing part in a heat insulating manner and which comprises at least one fastening structure by which the heat shield is attached to one of the housing parts of the exhaust gas turbocharger, the fastening means is in the form of a locking element for interlocking the heat shield with the one housing part, as well as to an arrangement of a heat shield between two housing parts of an exhaust gas turbocharger while being firmly attached to one housing part without contacting the other housing part.

According to the invention, the fastening means is formed as a locking element for interlocking the heat shield with the housing part. This enables to interlock the heat shield with the housing part, e. g. a bearing housing or a turbine housing, of the exhaust gas turbocharger, so that the heat shield is fastened to, or retained by itself, i. e. self-locking, at the housing part with which the heat shield is associated without the aid of another housing part of the exhaust gas turbocharger. In other words, when using the inventive heat shield it is not necessary to engage the heat shield between the two housing parts. Rather, the inventive heat shield may be mounted self-locking or self-clamping, respectively, at the housing part with which the heat shield is associated.

This is advantageous in that the heat shield does not need to be mounted dependent on both housing parts but only on one irrespective of the other. This makes an installation position, i. e. the seat, via which the heat shield is fastened to the corresponding housing part independent of a joining area where the housing parts are interconnected and where they for example, abut each other. In this way the heat shield may be fixed in position before assembly of the turbocharger which facilitates assembly.

Usually, the heat shield is clamped in the joining area between the housing parts. If the joining area is subjected to heat during the operation of the exhaust gas turbocharger whereby the joining area is heated, the clamping of the heat shield between the housing parts may become loose or the heat shield may even become detached due to different heat expansion coefficients of the housing parts so that the heat shield may undesirably change its position relative to the housing parts. This problem is prevented by the inventive heat shield because the fastening of the heat shield and thus its position relative to the housing parts is not dependent on the respective behavior of both housing parts, in particular in the case when heat is applied, merely to the housing part to which the heat shield is attached. This is of benefit for the proper function of the heat shield, so that the heat shield can thermally shield the first area against an excessive heat input. The arrangement enhances proper functioning of the entire exhaust gas turbocharger, thereby improving its function and operation even under high temperature conditions.

Furthermore, the inventive heat shield allows the establishment of a sealing area in which the housing parts are sealed against each other, separate from a fastening area in which the heat shield is retained to the housing part where the heat shield is attached. In other words, the sealing area is spaced from the fastening area, which provides for a separation of the relevant functions. Due to this separation of functions, the sealing area and the fastening area may be at least essentially optimally designed under the aspect of their tasks and requirements, which is of benefit for the satisfactory function of the exhaust gas turbocharger. It is thereby prevented that the sealing area and the fastening area mutually affect each other, in particular negatively, which may occur, in particular, when the heat shield c is clamped between the housing parts in the conventional manner. When clamping the heat shield in this manner between the housing parts, the sealing area is integrated in the fastening area or vice versa. This may result in negative mutual influences. Thus, the inventive heat shield is not subjected to any negative thermal influences at the sealing area and its sealing function.

Another advantage of the inventive heat shield is that at least one connecting means for connecting the two housing parts has to exert forces which are required merely for sealing and connecting the housing parts and which, e. g. act at least essentially in the axial direction of the exhaust gas turbocharger, without the necessity to exert an additional force for retaining and clamping the heat shield between the housing parts. This is the case since the heat shield is retained or fastened, respectively, by itself or automatically by a locking structure attaching it to one of the housing parts. This provides for a particularly strong connection between the housing parts which will not be negatively influenced by the heat shield and heating of the heat shield during the operation of the exhaust gas turbocharger.

Preferably, at least one additional locking element for interlocking the heat shield with the housing part is provided, with the locking elements being at least essentially equally spaced in the circumferential direction of the heat shield at the circumference thereof. This provides for a particularly well defined and secure fastening of the heat shield at the corresponding housing part, which is of benefit for the satisfactory functioning of the heat shield.

In an advantageous configuration, the locking element is resiliently provided at a base body of the heat shield. This allows a particularly time and cost efficient installation of the heat shield at the corresponding housing part, which is associated with a time and cost efficient manufacture of the entire exhaust gas turbocharger. Further, a particularly time and cost efficient removal of the heat shield from the housing part is possible, when necessary e. g. for repair purposes.

Preferably, the locking element is integrally formed with the heat shield or with the base body, respectively, of the heat shield. This keeps the number of parts, the costs and the weight of the inventive heat shield and thus of the entire exhaust gas turbocharger low.

In another particularly advantageous configuration of the invention, the locking element comprises at least one protrusion which may be received in a corresponding mounting feature of the housing part for locking the heat shield with the housing part. This permits a particularly easy mounting and removal of the heat shield.

It may also be provided that the locking element comprises at least one mounting feature, in particular a recess, in which a corresponding wall part of the housing part may be received for locking the heat shield with the housing part. For example, an undercut may be formed between the heat shield and the housing part, so that the heat shield may be mounted and removed particularly time and cost efficiently, on the one hand, and, on the other hand, may be retained particularly firmly at the housing part.

The mounting feature is formed e. g. as a mounting opening and in particular as a through-hole with which a wall of the housing part, in particular a locking element which is associated with the housing part, may be engaged.

Preferably, the recesses and/or the protrusions are formed at least essentially as spherical segments. Therefore, the heat shield may be installed particularly easily and thus time and cost efficiently. Furthermore, e. g. manufacturing tolerances and/or position tolerances both in the axial and the radial direction as well as in the circumferential direction of the heat shield may be compensated for, so that the heat shield may be securely and at least essentially play-free fastened to, and interlocked with, the corresponding housing part.

The second aspect of the invention relates to an arrangement of a heat shield between a first housing part and a second housing part of an exhaust gas turbocharger, in particular for a combustion engine, wherein the heat shield comprises at least one fastening structure, by means of which it is retained between the housing parts, which are to be shielded thermally from one another.

According to the invention, the fastening means is in the form of a locking element by means of which the heat shield is locked or engaged, respectively, with the first housing part. Advantageous configurations of the first aspect of the invention are to be considered as advantageous configurations of the second aspect of the invention and vice versa.

In the inventive arrangement, the position of the heat shield relative to the housing parts is mainly and in particular exclusively dependent on the first housing part, because the heat shield is retained and fastened exclusively by itself or automatically to the first housing part, with no contribution of the second housing part to the arrangement of the heat shield between the housing parts. Thereby, the relative position of the heat shield is not influenced by a different behavior of the housing parts, e. g. due to different heat expansion coefficients upon a corresponding temperature change. The chance that the heat shield becomes loose and moves relative to the housing parts due to a different behavior of the housing parts upon heat application is very low or even precluded with the inventive arrangement.

In the inventive arrangement, the first housing part is formed e. g. as a bearing housing of the exhaust gas turbocharger, in which a rotor of the exhaust gas turbocharger is supported. The second housing part is e. g. a turbine housing of the exhaust gas turbocharger, in which a turbine wheel of a turbine of the exhaust gas turbocharger is supported rotatably about an axis of rotation relative to the turbine housing. Alternatively, the first housing part may be the turbine housing, with the second housing part being e. g. the bearing housing.

The housing parts are connected e. g. in a joining area with one another and bear against each other at least indirectly, in particular, directly. Due to the fact that the heat shield is secured by the locking element automatically or by itself, respectively, at the first housing part, a sealing area between the two housing parts may be formed, in which the housing parts at least indirectly, in particular directly, bear against each other and are mutually sealed. The sealing area may be arranged separate and spaced from a fastening area, in which the heat shield is secured to the first housing part. Thereby, a separation of functions is achieved, so that the sealing area may be appropriately designed for an at least essentially optimum tightness of the housing parts, while the fastening area of the first housing part may be correspondingly designed for a secure fastening of the heat shield to the first housing part and accordingly optimized. It is not necessary to find a compromise between tightness and secure fastening of the heat shield. Furthermore, mutual negative influences of the sealing area and of the fastening area are prevented with the inventive arrangement.

The automatic or self-acting, respectively, fastening of the heat shield at the first housing part makes it also possible to arrange the sealing area in the radial direction of the exhaust gas turbocharger or of the rotor, respectively, at least essentially directly under the joining area, i. e. at least essentially in the radial direction towards the inside under, and adjacent to, the joining area. For this purpose, the housing parts are preferably combined at mating and sealing surfaces of the joining area and of the sealing area which are specifically provided and correspondingly designed and firmly connected with each other by means of a connecting means, such as e. g. a V-band clamp and/or bolts.

In another advantageous configuration of the arrangement, the heat shield is interlocked with the first housing part so as to prevent contact with the second housing part. This prevents essentially any influence of the second housing part on the heat shield and its mounting or fastening, respectively, to the first housing part, which is of benefit for the satisfactory functioning of the heat shield and thus of the entire exhaust gas turbocharger.

In order to achieve a particularly strong mounting of the heat shield to the first housing part, the first housing part comprises at least one additional locking element, in particular a mounting feature, which corresponds to the locking element via which the locking element of the heat shield is locked or engaged, respectively. Preferably, an undercut is formed by the locking elements, in particular in the axial direction of the exhaust gas turbocharger or of the rotor, respectively, so that the heat shield in particular in the axial direction is held and fastened in a defined manner.

The first housing part comprises e. g. a mating surface area and/or groove in which the locking element or the locking elements of the heat shield may be seated. The mating surface area corresponds to the locking element or the locking elements of the heat shield, which is formed to be e. g. at least essentially circular as well as concentric with respect to the axis of rotation of the rotor and in the circumferential direction at least in portions extending circumferentially. Thus, the heat shield may be fastened at the first housing part precisely, and securely as well as time and cost efficiently.

The locking element of the heat shield is also referred to as clip. The locking element is formed e. g. by means of a bending method and formed integrally with the heat shield and is inclined relative to the radial direction of the exhaust gas turbocharger e. g. in the direction of one of the housing parts. As a result, the locking element extends e. g. at least essentially obliquely to the radial direction or obliquely, respectively, to the axial direction.

The locking element may be connected to the heat shield or to a base body, respectively, of the heat shield by welding and/or by means of screws and/or rivets and/or by another joining method. This allows a cost efficient manufacture of the heat shield. Furthermore, a form connection of the locking element with the heat shield is achieved. Between the heat shield and at least one of the housing parts, in particular relative to the axial direction, at least one elastic element may be arranged. Thereby, the heat shield may e. g. be preloaded and thus held particularly firm against the first housing part. The elastic element may be formed as a sealing element in order to at the same time seal the housing parts in a particularly advantageous manner.

The invention and advantages, features and details thereof will become more readily apparent from the following description of preferred exemplary embodiments described below with reference to accompanying the drawings. The features and feature combinations as previously mentioned in the description as well as the features and feature combinations which will be mentioned in the following description of the figures and/or which are solely illustrated in the figures are not only applicable in the respective indicated combination but also in other combinations or isolated, without deviating from the scope of the invention.

BRIEF DESCRIPTION OF THE DRAWINGS

FIG. 1a shows a schematic longitudinal view of an exhaust gas turbocharger for a combustion engine in portions, wherein a turbine housing and a bearing housing are connected with each other, with a heat shield being arranged between the turbine housing and the bearing housing, but locked to the bearing housing and is thus held in position independently of the turbine housing;

FIG. 1b shows the heat shield according to FIG. 1a in a perspective view;

FIG. 2a shows, in an axial cross-sectional view, another embodiment of the exhaust gas turbocharger heat shield attachment according to FIG. 1a;

FIG. 2b shows the heat shield according to FIG. 2a in a perspective view;

FIG. 3a shows an axial cross-sectional view in portions of another embodiment of the exhaust gas turbocharger heat shield attachment according to FIGS. 1a and 2a;

FIG. 3b shows the heat shield according to FIG. 3a in an axial cross-sectional perspective view;

FIG. 4a shows another embodiment of the exhaust gas turbocharger heat shield attachment according to FIGS. 1a to 3a in an axial cross-sectional view;

FIG. 4b shows the heat shield according to FIG. 4a in a perspective view;

FIG. 5a shows another embodiment of the exhaust gas turbocharger heat shield attachment according to FIGS. 1a to 4a in an axial cross-sectional view;

FIG. 5b shows the heat shield according to FIG. 5a in a perspective view;

FIG. 5c shows the heat shield according to FIG. 5b a perspective view;

FIG. 6a shows another embodiment of the exhaust gas turbocharger heat shield attachment according to FIGS. 1a to 5a in an axial cross-sectional view;

FIG. 6b shows a detail of the exhaust gas turbocharger heat shield attachment according to FIG. 6a; and FIG. 6c shows the heat shield according to FIGS. 6a and 6b in a perspective view.

DESCRIPTION OF EXEMPLARY EMBODIMENTS

FIG. 1a shows an exhaust gas turbocharger section 10 which comprises a bearing housing 12. At, and at least partially inside, the bearing housing 12 a rotor (not shown) of the exhaust gas turbocharger section 10 is to be supported so as to be rotatable about an axis of rotation 14 relative to the bearing housing 12. The rotor comprises a shaft which is to support the rotor in the bearing housing 12. A turbine wheel (not shown in detail) of a turbine 16 (not shown in detail) of the exhaust gas turbocharger 10 is connected to the shaft for rotation with the shaft.

The turbine wheel is at least in portions accommodated rotatably about the axis of rotation 14 in a mounting space 20 which is at least in portions confined by the turbine housing 18 of the turbine 16. The turbine housing 18 comprises at least one supply channel via which exhaust gas of a combustion engine of motor vehicle, which is associated with the exhaust gas turbocharger 10, may be supplied to the turbine wheel. Hence, the turbine wheel may be subjected to the exhaust gas and driven by the exhaust gas.

An impeller (not shown) of the rotor is also connected to the shaft of the rotor for rotation therewith. The impeller is arranged in a mounting space which is at least in portions confined by a compressor casing of a compressor (not shown in detail) of the exhaust gas turbocharger 10 and is rotatable about the axis of rotation 14. The compressor casing comprises at least one supply channel via which air may be supplied to the impeller. Because of the turbine wheel which is driven by the exhaust gas, the impeller is also driven, so that the air to be supplied to the combustion engine is compressed by means of the impeller.

Because exhaust gas of a relatively high temperature flows through the turbine housing 18 during operation of the exhaust gas turbocharger 10, the bearing housing 12, in particular in the area of the mounting space 20, is subjected to heat. In order to avoid an undesirably excessive heating of at least a portion of the bearing housing 12, a heat shield 22 of the exhaust gas turbocharger 10 is arranged between the bearing housing 12 and the turbine housing 18, in particular between the bearing housing 12 and the mounting space 20. By means of the heat shield 22, the bearing housing 12 is thermally shielded against the turbine housing 18 or the mounting space 20, respectively.

For mounting the rotor and for connecting the shaft with the turbine wheel, the bearing housing comprises a central opening 13, which is also referred to as central bore, and through which the shaft extends. The shaft may extend via the central opening 13 as far as to the turbine wheel in the mounting space 20, so that the turbine wheel may be connected with the shaft. The heat shield 22 comprises a through-hole 23 corresponding to the central opening 13, through which the shaft of the rotor extends in order to be connected to the turbine wheel for rotation therewith.

As may be seen from FIG. 1a, the bearing housing 12 and the turbine housing 18 are connected with each other in a joining area 25. A sealing area 26 is also arranged in the joining area 25, where the bearing housing 12 and the turbine housing 18 are in contact with each other and bear against each other. In the sealing area 26, the bearing housing 12 and the turbine housing 18 comprise respective sealing surfaces, so that an undesired leakage of exhaust gas from the exhaust gas turbocharger 10 may be prevented. In the joining area 25, respective mating surfaces are provided, via which the turbine housing 18 and the bearing housing 12 are centered to each other and held against one another.

As may be also seen from FIG. 1a, the heat shield 22 is interlocked with the bearing housing 12 and clamped automatically or self-holding, respectively, without additional assistance from the turbine housing 18.

For locating and mounting the heat shield 22 in the axial direction, in particular relative to the axis of rotation 14 as well as in the radial direction, in particular relative to the axis of rotation 14, the heat shield 22 comprises so-called clips 24, as may be seen in particular in FIG. 1b, that is, locking elements, which are resiliently held at a base body 27 and integrally formed with the base body 27. The clips 24 are distributed in the circumferential direction of the heat shield 22 over its circumference at least essentially equally spaced, so that the heat shield 22 may be fastened and locked to the bearing housing 12 particularly firmly. Thus, the clips 24 enable a particularly time and cost efficient mounting and removal of the heat shield 22.

The bearing housing 12 comprises a mating surface 28 corresponding to the clips 24, which extends at least essentially circularly and concentrically to the central opening 13. The mating surface 28 is formed in the circumferential direction relative to the axis of rotation 14 fully circumferentially and is formed by a recess 30 of the bearing housing 12, which corresponds to the clips 24 and in which the clips 24 are accommodated.

The resilient clips 24 are formed as at least essentially L-shaped tongues which are inclined relative to the radial direction towards the inside of the heat shield 22. It is also possible to form the clips 24 conversely for achieving a clamping sense opposite to that as previously described. In other words, the clips 24 ray also be inclined outwards relative to the radial direction and engage in a corresponding groove of the turbine housing 18 and be seated therein.

As may be seen in particular from FIG. 1a, the heat shield 22 is locked or engaged, respectively, with the bearing housing 12 in a fastening area 32 by means of the clips 24. The fastening area 32 is formed separate and spaced from the sealing area 26. This means that the fastening area 32 and the sealing area 26 cannot negatively influence each other, in particular with respect to their respective functions. Rather, the sealing area 26 may be at least essentially optimally formed for achieving an advantageous tightness of the exhaust gas turbocharger 10, while the fastening area 32 may be at least essentially optimally formed for implementing a firm fastening of the heat shield 22 to the bearing housing 12.

As may also be seen from FIG. 1a, the sealing area 26 relative to the radial direction is at least essentially arranged radially within the joining area 25. The bearing housing 12 and the turbine housing 18 are combined at the mating and sealing surfaces which are specifically provided and are firmly connected by means of at least one connecting means such as e. g. a V-band clamp and/or bolts.

FIGS. 2a and 2b show an alternative embodiment of the exhaust gas turbocharger 10 wherein the heat shield 22 is self-clamping that is fastened at the bearing housing 12 without additional assistance of the turbine housing 18 and interlocked with it. The locking elements of the heat shield 22 are formed as respective clasps 34 which are resiliently held at the base body 27 of the heat shield 22 and integrally formed with it. Thus, the axial and radial seat of the heat shield 22 is ensured by the resilient clasps 34 which are seated in a specifically provided groove 36 of the bearing housing 12. The groove 36 extends at least essentially circularly and concentrically to the central opening 13 and extends circumferentially.

The resilient clasps 34 are formed as recesses in the outside 37 of the heat shield 22, which are inclined in the radial direction and project towards an inner side of the heat shield 22. Relative to an inner side 38 of the heat shield 22, the resilient clasps 34 are formed as protrusions. In the axial direction, respective mounting openings 39 are associated with the respective clasps 34 so that respective undercuts of the resilient clasps 34 with a corresponding wall 40 of the bearing housing 12 may be formed.

This again allows the implementation of a reversed clamping sense or locking sense, respectively, with the resilient clasps 34 e. g., being inclined outwardly relative to the radial direction and being engageable in a corresponding groove of the turbine housing 18.

FIGS. 3a and 3b show another embodiment of the exhaust gas turbocharger 10, wherein the heat shield 22, again without additional assistance of the turbine housing 18, is fastened at, and locked to, the bearing housing 12. Different from the exemplary embodiment according to FIG. 2a and FIG. 2b, the resilient clasps 34 of the heat shield 22 according to the embodiment of FIG. 3a and FIG. 3b are connected only at one side with the base body 27 of the heat shield 22 relative to the circumferential direction, while there the resilient clasps 34 relative to the circumferential direction are connected at both sides with the base body 27 and thus with the remaining heat shield 22. In other words, the respective mounting openings 39 which extend at least essentially in the circumferential direction provide for respective openings 42 which extend at least essentially in the axial direction, so that the openings 42 in the radial direction form through-passages of the heat shield 22 extending in the axial direction of the turbine housing 18 through the heat shield 22 and are not confined that is they are open in the axial direction of the bearing housing 12

This heat shield 22 according to the embodiment of FIGS. 3a and 3b also provides for an easy assembly. With this heat shield 22, too, a correspondingly reversed clamping sense or locking sense, respectively, is possible, wherein the resilient clasps 34 in the radial direction do not project inwardly but outwardly toward of the turbine housing 18 and may be seated in a respective groove of the turbine housing 18.

FIGS. 4a and 4b show still another embodiment of the exhaust gas turbocharger 10 with a heat shield 22, wherein the axial and radial seating of the heat shield 22 is ensured by resilient clips 24 at the heat shield 22. The clips 24 engage at a, or in, a specifically provided edge 44 and/or groove 36 of the wall 40. The edge 44 and/or the groove 36 extend circularly and concentrically to the central opening 13 and is formed in the circumferential direction at least essentially fully circumferentially.

As may be seen in particular from FIG. 4b, the resilient clips 24 are in the form of projections which are inclined inwardly relative to the radial direction towards the inside of the heat shield 22. They extend at least essentially in the axial direction and snap into respective mounting openings 39 formed into the wall 40 of the bearing housing 12 for forming a respective undercut. The projections project in the axial direction towards the turbine housing 18 into the mounting openings 39. With the exhaust gas turbocharger 10 according to FIGS. 4a and 4b, too, a corresponding reverse fastening with a correspondingly reversed clamping sense or locking sense, respectively, is possible, wherein the resilient clips 24 are not inclined inwardly but outwardly relative to the radial direction and be engaged with an edge and/or groove formed into the turbine housing 18. The heat shield 22 according to FIGS. 4a and 4b also provides for a simple installation.

FIGS. 5a to 5c show another embodiment of the exhaust gas turbocharger 10. The locking elements of the heat shield 22 are formed as resilient protrusions 45 extending to the inner side 38, which at the outer side 37 form indentations of the heat shield 22.

The resilient protrusions 45 may be engaged in a corresponding annular groove 46 of the bearing housing 12, which is arranged concentrically and in particular in a circular array around to the central opening 13 so that the heat shield 22 can be installed time and cost efficiently. The protrusions 45 are implemented as radially recessed ball indentations which are inclined relative to the radial direction towards the inside of the heat shield 22. In other words, the protrusions 45 are formed at least essentially as spherical segments. With the heat shield 22 or the exhaust gas turbocharger 10, respectively, according to FIGS. 5a to 5c, a reverse clamping sense or locking sense, respectively, is possible, wherein the locking elements relative to the outer side 37 are formed as resilient protrusions, which may be locked with corresponding indentations of the turbine housing 18.

FIGS. 6a to 6c show still another embodiment of the exhaust gas turbocharger 10 with the heat shield 22. The axial and radial seat of the heat shield 22 is ensured by resilient dips 24 of the heat shield 22, which engage a corresponding recess 30 of the turbine housing 18. The recess 30 of the turbine housing 18 extends circularly and concentrically to the central opening 13. In other words, the recess 30 is formed in the circumferential direction at least essentially fully circumferentially and provides a recessed mating surface 28 where the clips 24 are seated, in order to clamp the heat shield 22 self-holding or self-locking to the turbine housing 18 without effect and contribution of the bearing housing 12. In other words, the bearing housing 12 is not involved in holding the heat shield 22 at the turbine housing 18 and in arranging the heat shield 22 between the bearing housing 12 and the turbine housing 18.

The clips 24 are implemented by at least essentially double S-shaped tongues, which are inclined relative to the radial direction towards the outer side 37 of the heat shield 22.

In the assembly of the exhaust gas turbocharger 10, the heat shield 22 is supported by contact of respective contact surfaces 48 of the base body 27 with the bearing housing 12 in the axial direction until the heat shield 22 interlocks with the turbine housing 18 and snaps into the recess 30 by the clamping force of the clips 24, which are held resiliently at the base body 27. After locking, there is no longer any contact between the heat shield 22 and the bearing housing 12 at the respective contact surfaces 48. Preferably, there is no contact at all between the heat shield 22 and the bearing housing 12 after the heat shield 22 is locked to the turbine housing 18.

With the exhaust gas turbocharger 10 including the heat shield 22 according to FIGS. 6a to 6c, too, a reverse clamping sense or locking sense, respectively, is possible, wherein the clips 24 may engage a corresponding recess of the bearing housing 12. The heat shield 22 according to FIGS. 6a to 6c, too, may be mounted time and cost efficiently and in this case is to locked with the turbine housing 18.

What is claimed is:

1. A heat shield for an exhaust gas turbocharger having a bearing housing part (12) attached to a turbine housing part (18) of an exhaust gas turbocharger (10), the heat shield (22) being arranged between the bearing housing part (12) and the turbine housing part (16) so as to limit heat transfer between the turbine housing part (18) and the bearing housing part (12) and comprising a base body (27) provided at its circumference with locking elements (24, 34, 45), for resiliently connecting the heat shield (22) to one of the housing parts (12, 18) of the exhaust gas turbocharger (10), the locking elements (24, 34, 45) interlocking the heat shield (22) with the housing part (12, 18) to which the heat shield is attached, the locking elements (24, 34, 45) comprising recesses, in which a corresponding wall portion of the housing part (12, 18) is accommodated for interlocking the heat shield (22) with the respective housing part (12, 18) at least one of the recesses and the locking elements (45) being in the form of an at least essentially spherically shaped segment.

2. The heat shield according to claim 1, wherein the locking elements (24, 34, 45) are integrally formed with the base body (27) of the heat shield (22).

3. The heat shield according to claim 1, wherein each locking element (24, 34, 45) comprises at least one protrusion (45) for be accommodation in a corresponding mounting feature (46) of the housing part (12, 18) to which the heat shield (22) is to be connected for interlocking the heat shield (22) with the respective housing part (12, 18).

4. An arrangement of a heat shield between a bearing housing part (12) and a turbine housing part (18) of an exhaust gas turbocharger for a combustion engine, wherein the heat shield (22) is mounted by fastening elements (24, 34, 45), to one of the housing parts (12, 18) so as to be arranged between the housing parts (12, 18) thereby limiting heat transfer between the turbine housing part (18) and the bearing housing part (12), the fastening elements (24, 34, 45) being in the form of resilient locking elements (24, 34, 45) which are provided at the circumference of the heat shield (22) and by which the heat shield (22) is elastically locked to one of the housing parts (12, 18) the heat shield being locked to the bearing housing part (12) without being in contact with the turbine housing part (12) and the bearing housing part (12) comprising an additional locking structure (24, 34, 45) in the form of a recess (30, 36, 46) in which the locking element (24, 34, 45) of the heat shield (22) is accommodated and securely locked in position.

\* \* \* \* \*